United States Patent [19]

Schwenzer

[11] 4,397,709

[45] Aug. 9, 1983

[54] LABELING MACHINE

[75] Inventor: Alfred F. Schwenzer, Totowa, N.J.

[73] Assignee: NJM, Inc., Fairfield, N.J.

[21] Appl. No.: 411,652

[22] Filed: Aug. 26, 1982

[51] Int. Cl.³ .................................................. B32B 1/00

[52] U.S. Cl. .................................... 156/351; 156/361; 156/378; 156/522; 156/384

[58] Field of Search ................ 156/351, 378, 361-363, 156/353-355, 522, 350, 64

[56] References Cited

U.S. PATENT DOCUMENTS

| | | | |
|---|---|---|---|
| 3,713,948 | 1/1973 | Kluger | 156/351 |
| 3,779,829 | 12/1973 | Wolff | 156/361 |
| 4,248,655 | 2/1981 | Kerwin | 156/363 X |
| 4,294,644 | 10/1981 | Anderson | 156/361 |
| 4,295,915 | 10/1981 | Sakaguchi | 156/361 |
| 4,321,103 | 3/1982 | Lindstrom et al. | 156/361 |

*Primary Examiner*—David A. Simmons
*Attorney, Agent, or Firm*—John J. Hart; Charles E. Baxley

[57] ABSTRACT

The labeling machine comprises means for feeding a succession of products toward and past a label applying station, means for feeding a series of labels along a path toward the label applying station, a label length monitor including means for counting a predetermined number of given fractional label lengths totaling a whole length greater than the length of a given label and means to control the feed of the label feeding means, a product sensor connected to the control means and starting the feed of the label feeding means each time a product is detected, a label sensor connected to said control means and causing the latter to stop the label feeding means each time the leading edge of a label moves through a given point before said counting means has counted said predetermined number of given fractional lengths, said counting means being operable to cause the control means to stop the operation of the label feeding means if the label sensor has failed to actuate the control means before said predetermined number of lengths has been counted by said counting means.

6 Claims, 2 Drawing Figures

LABELING MACHINE

THE INVENTION

This invention relates to the application of labels to articles and is more particularly concerned with the application of labels cut from a continuous length of label web or separably adhered to a backing web.

One of the disadvantages of applying cut labels from a stack is the strong likelihood that a wrong label may be applied to a given type of article. Industries such as the drug and pharmaceutical industries cannot afford to have such a situation take place. Accordingly, such industries have come to rely more on roll labels and pressure sensitive labels provided on backing strips. However, the application of labels from a roll is subject to other problems. For example, there is the difficulty of providing a feeding means which will at all times feed the exact amount of web in timed relation to other mechanisms. Further, splices are often necessary due to removals as a result of quality inspection, press breaks, etc. In splicing together various lengths of tapes to give proper roll diameter, etc., there is the possibility of different labels being connected together. In the case of pressure sensitive labels, it is not unusual for a label to be missing from the backing sheet which results in trouble and delay in the labeling operations.

The art has expended a great deal of time, talent and substantial sums of money in its efforts to overcome the aforesaid problems and while there have been various successful approaches to the solutions of such problems there has not been provided a single satisfactory solution to all of such problems.

The principal purpose of the present invention is to provide in a labeling machine a novel means capable of rendering the labeling machine inoperative to feed a label web or a backing strip carrying pressure sensitive labels to a place of application to a given product, when such means detects in the label web a label having a greater length than the given label for such given product, or detects the absence of a given pressure sensitive label on a backing strip.

One of the objects of the invention is to provide in a labeling machine a time independent label length monitor capable of permitting the successive feeding without interruption to a place of label application of a given length of label web occupied by a single label, or a plurality of labels, but preventing the feed to such place of application of a length of label web carrying a single label, or a plurality of labels and having a length greater than said given length of label web.

Another object of the invention is to provide in a labeling machine a time independent monitor capable of permitting the successive feeding without interruption to a place of label application of a backing strip provided with an uninterrupted sequence of pressure sensitive labels, but stopping the feed of the backing strip whenever there is a pressure sensitive label missing from the sequence thereof.

Figure 1:
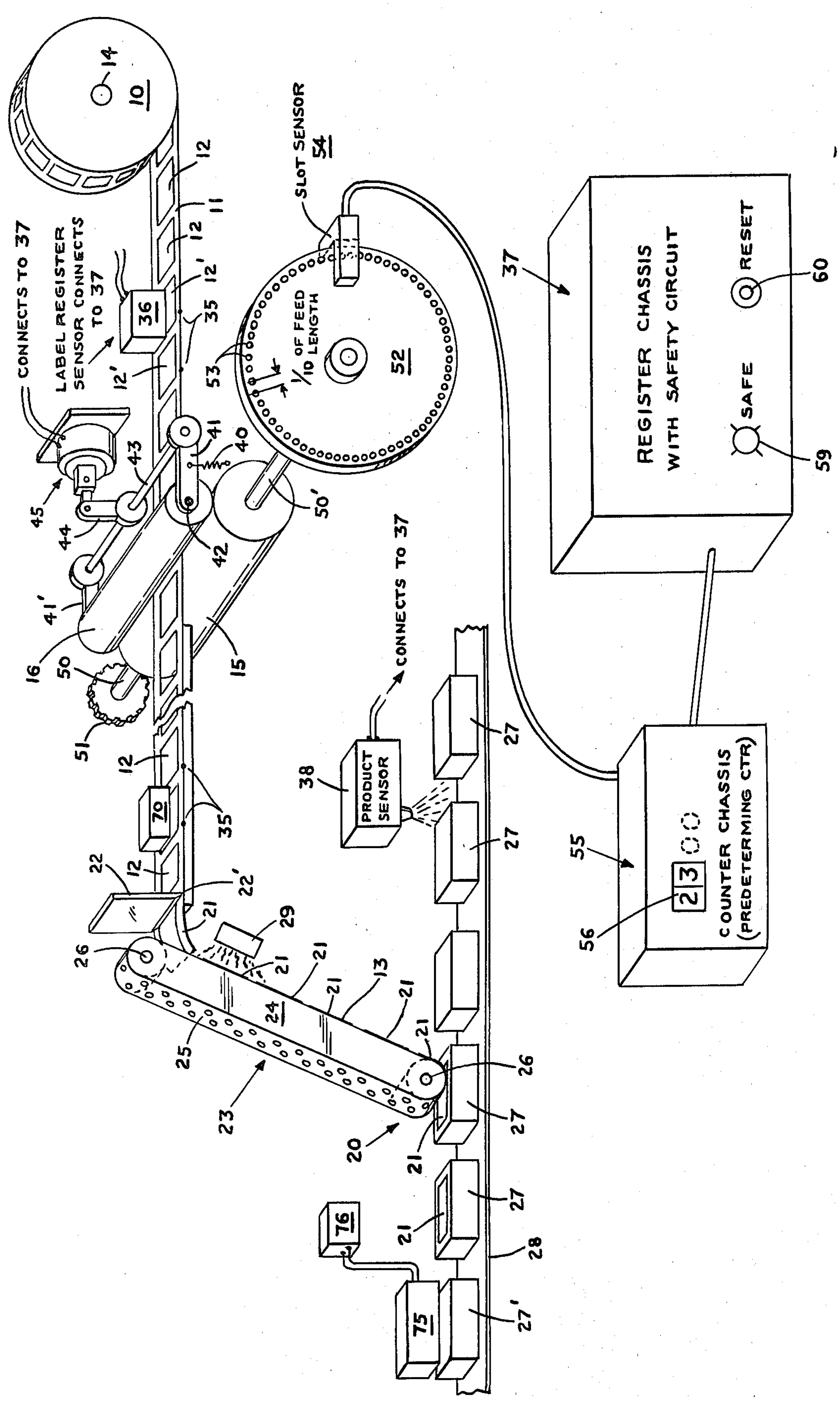
Figure 2:
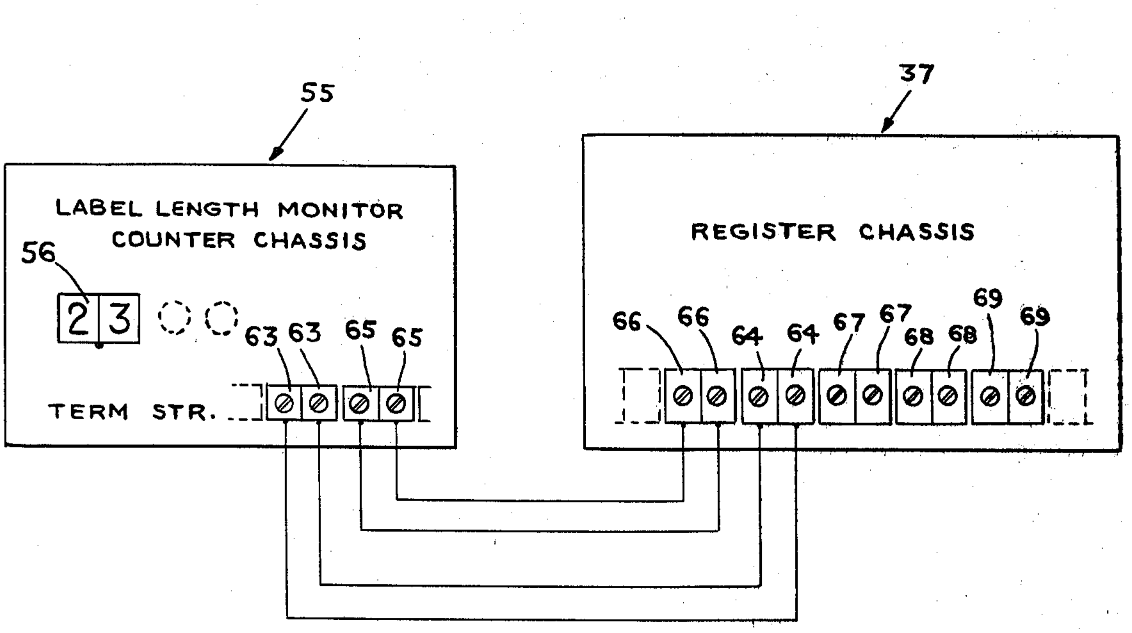

Other objects of the invention, as well as the advantages and novel features thereof, will become apparent from the following description when read in connection with the accompanying drawings in which FIG. 1 is a perspective diagrammatic view showing how the means of this invention may be utilized in a labeling machine applying labels from a roll of label web; and FIG. 2 is a diagrammatic view showing certain terminal arrangements in the label length monitor of this invention.

In the aforesaid drawing, the reference numeral 10 generally designates a roll of label web constituted of a continuous strip 11 of paper printed on its face side with a series of given labels 12 of a given size and provided on its reverse side with a suitable coating 13 of thermosensitive adhesive. The roll 10 is mounted on a suitable support having a shaft 14 rotatably and removably mounted on the support in a customary manner. The labels in the roll 10 are fed therefrom along a defined path in the labeling machine by a feed roll 15 and a pressure roll 16. The label web 11, as it is drawn from the roll 10 by the rolls 15,16 has it face side uppermost and its reverse adhesive coated side disposed downwardly. As the label web 11 is fed toward the label applying station generally designated 20, the leading labels 21 in the web are periodically severed therefrom by suitable cutting mechanism 22,22' whose operation is intermittently actuated in any suitable manner known to the art. The severed leading or terminal label 21 is then picked up by a vacuum device 23 of known construction. As illustrated, the vacuum device 23 may be an elongated closed compartment composed of side walls 24 and an endless perforated belt 25 supported at its ends on pulleys mounted on shafts 26,26 which are continuously driven in a known manner. The compartment of the vacuum device 23 is furnished with a suitable degree of vacuum in a known manner to hold the terminal labels 21 onto the lower run of the belt 25 as they are successively severed from the label web 11. The elongated vacuum device 23 extends from a position adjacent to the cutting mechanism 22, downwardly and forwardly to a position at which it can apply the leading label 21 thereon to the upper side of an article 27 delivered to the label applying station 20 by an article feeding conveyor belt 28 in a known manner. As the severed leading labels 21 carried by the vacuum device 23 travel from the cutting mechanism 21,21' to the label applying station 20, a heating element 29 of known construction heats the thermosensitive adhesive coatings 13 on such labels to adhesively activate such coatings. Because the tackiness of the adhesive on the labels subjected to the heating element 29, is greater than the hold of the vacuum applied at the surface of the belt 25 on the vacuum device 23, the foremost label will be stripped from such belt when it comes into contact with the upper surface of the article 27. As is customary in the art the label 21 applied to an article 27 may be completely pressed into contact with the article surface at a subsequent station by a suitably located rotatable roll (not shown).

It will be noted that each of the labels 12 in the label web 11 is provided at a given place with a label register mark 35 of any suitable form known to the art, such as a hole, or printed in the form of definite marks, bars, etc. The register marks are spaced apart on the label web 11 a given distance equal to the given length of a given label to be applied to a particular product such as the article 27. Positioned adjacent to the label web 11, is a label register sensor 36 constituted of a known photoelectric device connected to and capable of sending a signal to a control box 37 which may be a known register chassis provided with a safety circuit, when a register mark 35 on a label in the feed of the web 11 comes into registration with the register sensing means of the sensor 36. The position of the register scanner 36 may be located anywhere along the path of the continuous web 11, but for the sake of clarity it is shown in the drawing as being located between the roll 10 and the feed rolls 15,16. As will hereinafter be seen the sending of a signal by the register scanner 36 to the register chassis or control box 37 will cause the latter to control the feed of the label web 11. It will be understood that the register sensor 36 is located a given multiple of the length of the given label from the feed rolls 15,16 and located a different given multiple of the length of the given label from the cutting mechanism 22,22', that the operations of the scanner 36 will be pertinent to the severed label 21 that is to be applied to the product 27 which activated the product sensor 38. The product sensor 38 is a photoelectric device that is also electrically connected to the register chassis or control box 37, and which is triggered by an article advanced by the conveyor 28 to cause the control box 37 to initiate the feed of the label web 11 in a manner to be hereinafter more fully explained.

The feed roll 15 is a constantly rotating roll connected in any suitable manner to the driving means of the labeling machine or driven by its own motor. The feed roll 15 has a circumferential dimension that can be divided into any whole number that may be considered suitable for the operation of a hereinafter referred to predetermining counter 55. For instance, the circumferential dimension should be such that it can be divided into a given whole number of any known useful fraction that will relate the numbers generated by the counter 55 to common fractions of an inch. Thus, by way of example, it may be assumed that the circumference of the roll 15 is exactly 10 inches. Such dimension can be divided into 100 equal spaces so that each number registered by the counter 55 would represent 1/10 or 0.10" of feed length of a label 12. Of course, other combinations are possible and each number on the counter 55 could represent another useful fraction of label feed length.

The feed roll 16 is a pressure roll that is biased into engagement with the feed roll 15 by a pressure spring 40 connected at one end to a roll supporting arm 41 and at its other end to a stationary part of the labeling machine. When the feed roll 16 is so biased the label web 11 will be clamped between the two rolls 15 and 16 and consequently will be drawn from the roll 10 and fed toward the cutting mechanism 22. The pressure roll 16 is mounted on a shaft 42 which is rotatably supported at its ends by the arm 41 and a similar arm 41' fixedly mounted on the ends of a transverse rod 43. The rod 43 has secured thereto intermediate its length, the lower end of a depending link 44, the other end of which is pivotally connected to the protruding end of the armature of a solenoid 45 that is electrically connected to the register chassis 37 and through the latter is controlled by the register mark sensor 36, as will hereinafter be more fully explained.

The shaft 50 of the constantly driven feed roll 15 is provided at one end with a gear 51 by which it is drivenly connected in a known manner to the feed roll driving means, and such shaft at its other end extends beyond the adjacent end of the feed roll 15 to provide an extension 50'. Mounted on the outer end of the shaft extension 50' is a counting disc 52 that marks one revolution of the feed roll 15. Located at the outer periphery of the counting disc 52 are a series of marks 53, such as printings, the illustrated holes, or slots. These marks 53 are selected to correspond to the circumference of the feed roll 15 in a certain relation so as to represent given positions of the length of the given label 21. Thus, if the circumference of the feed roll 15 is exactly ten inches, as has previously been assumed, the outer periphery of the disc 52 may be divided into 100 equal spaces. Therefore, the space between each of the marks 53 represents 1/10 or 0.100 inches of the length of a label that is fed by the rolls 15,16. Of course, as has previously been explained, other combinations are possible and the space between each of the marks 53 could represent 1/16", 1/32" or other useful fractions of the circumference of the feed roll 15.

The feed length marks 53 are read or sensed by a known make of slot sensor 54 and fed as clock pulses into a predetermining counter 55 which is a commercially available multi-decade unit such as the Veeder-Root #7994-02-141 unit which can be remotely reset with an electrical pulse produced by the control box 37. When the clock pulses are fed by the sensor 54 into the predetermining counter 55, the latter is advanced one count for each pulse. The predetermining counter 55 may be adjusted to count any preset number of pulses which are registered on the visual counter display 56. As indicated in the drawing, the predetermining counter display 56 may be preset to count 23 impulses which represents a length slightly greater than the distance between the label register marks 35 on the label web 11, or the length of each of the given labels for the given product. The predetermining counter 55 is electrically connected to the register chassis 37 to enable the latter to cancel the counting of the counter 55 and reset it to zero. The manner in which the predetermining counter 55 is connected to certain of the terminals in the register chassis 37 is indicated in FIG. 2 of the drawings. As shown in FIG. 2, the output terminals 63,63 of the counter 55 are connected to the safety switch terminals 64,64 of the chassis 37, and the reset terminals 65,65 of the counter 55 are connected to the reset terminals 66,66 of the chassis 37. FIG. 2 also shows the terminals 67,67 in the chassis 37, to which the label sensor 36 is connected, the terminals 68,68 in such chassis to which the product sensor 38 is connected, and the terminals 69,69 in such chassis to which the solenoid 45 is connected.

It will be understood from the foregoing description, that in the operation of the described mechanism, the presence of a given product 27 to be labeled at the applying station 20 by a given severed label 21 for such product, is sensed by the product detector 38. When such product is sensed, the detector 38 signals the control box 37 to deenergize the solenoid 45. When that occurs, the pressure spring 40 forces the pressure roll 16 toward the feed roll 15 to clamp the label web 11 against such feed roll and thereby cause the label web to be moved toward the cutting mechanism 22. Simultaneously, the control box 37 unlatches the predetermining counter 55 allowing the pulses generated by the slot sensor 54 from the counter disk 52 to advance the counts in the predetermining counter 55.

If the register mark 35 on the label web 11 which is advancing toward the label register sensor 36 as such web is moved, is detected by the sensor 36 before the preset number 56 (i.e. 23) in the predetermining counter 55 has been reached, the register chassis or control box 37 will signal the solenoid 45 to energize, thereby lifting the pressure roll 16 and stopping the label feed. At this time the cutting mechanism 22,22' is actuated in a known manner to sever the terminal label 21 from the label web 11. The control box 37 will also simultaneously signal the predetermining counter 55 to cancel the count it has made and reset the counter to zero. The aforesaid cycle of operation of the apparatus will be repeated so long as this condition exists and the labeling machine will continue uninterruptedly its intermittent labeling of the products 27.

If on the other hand, the feed of the label web is such that the predetermining counter 55 reaches the preset number 56 (i.e. 23) before said advancing register mark 35 has been detected by the label register sensor 36, the predetermining counter 55 will initiate a supervisory signal causing the control box 37 to go into a "safe" condition. This "safe" condition will cause the control box 37 to energize the solenoid 45 to lift the pressure roll 16 to unclamp the label web 11 and thereby stop the label feed. Such condition will also initiate a latching circuit in the control box 37 which will prevent the next product 27 advancing on the conveyor 28 to start a label feed through the product sensor 38.

The condition causing "safe" must be cleared and the machine must be manually reset before the labeling operation can be continued. This "safe" condition is indicated by a "failsafe" light 59 on the control box 37. There is also provided on the control box 37, an external reset button 60 which must be manually operated to deactivate the "safe" condition. This reset button unlatches the "safe" condition and resets the predetermining counter 55 to zero. Only then will the presence of a product at product detector 38 be enabled to signal the control box 37 to restart the feed of the label web.

It will be seen from the foregoing that the above described monitor will permit the regular application of labels to given articles and products so long as such labels are the correct labels for such given articles. However, should there be included in the label web being fed to the feed rolls 15,16 a label longer than the particular label for the product being labeled the monitor will promptly shut down the labeling machine. While in the label web 11 illustrated in the drawing there is provided a register mark 35 for each label, such register marks may be spaced a distance of several label lengths, say six labels. In this case the counter chassis 55 may be preset to count say 140 clock pulses from the slot sensor 54. In such an arrangement, the feed rolls 15,16 will feed six labels successively and uninterruptedly before the feed of the web is stopped and the cutting mechanism 22,22′ actuated. Further, while a regular type of label is shown in the drawing, the monitor is particularly designed for use with pressure sensitive labels which are fed to a labeler in precise spaced relation on a backing strip. In this case the sensor 37 can be actuated by the leading edges of the spaced labels on the backing strip thus dispensing with the necessity of providing register marks, and instead of the cutting means 22,22′ shown in the drawing such means may be replaced by the usual dispensing edge of peeling blade member for separating the pressure sensitive labels from the backing strip. It often happens that there is a label missing from such backing strips which can cause trouble and delay in the labeling operation. This is due to the fact that in prior devices, the web of labels, once signalled to feed, will feed continuously until a pressure sensitive label on the backing strip is detected by the label sensor 36. Thus, it is possible that an indeterminate number of labels will feed through the machine in one continuous movement of web until the label sensor 36 detects a label. With the monitor of this invention, however, if a preset interval passes and a succeeding label does not come along because it is missing from the label backing strip, the monitor will immediately shut down the labeler to prevent the accumulation of sticky labels at the label peeling blade. It will also be understood from the foregoing description, that this same stoppage of the feed of a roll of labels will occur if a recognizable register mark 35 fails to appear because of the improper character of the mark, or its absence.

The above described label length monitor constituted of the counting disc 52 and slot sensor 54, the predetermining counter 55 and the register chassis 37, can also be employed in the printing of certain information on the labels. For example, in the case of pharmaceutical labels it is important that all labels in a given run have imprinted thereon the batch number of the product being labeled and the expiration date in the use of such product as a means of liability protection. The usual labeler presently in use will pass the void left by a missing pressure sensitive label, or a label in a roll web that is not provided with a proper register mark 35, and register for a printing action on the next pressure sensitive label that is present on the backing strip, or the next label in the roll web that is provided with a proper register mark 35. The result will be that such a labeler will feed one or more labels past the imprinting station without printing the desired information on it or them. The aforesaid label length monitor of this invention can be connected in the register chassis or control box 37 in such a way that it serves as a back-up register system and not cause the machine to go on safe, as has been previously explained, but will actually register the label and reset itself to zero without external manipulation. Such a connection is accomplished by disconnecting the wires attached to the output terminals 63,63 of the counter 55 from the safety switch terminals 64,64 in the chassis 37, and connecting such wires to the label sensor terminals 67,67 in the chassis 37. When such change is made the output terminals 64,64 in the chassis 37 will be in parallel relation with the label sensor 36.

When the counter 55 and the chassis 37 are connected as above described, the label length monitor will feed a pressure sensitive label strip, or a label web, in a step-by-step fashion no more than one label pitch (a label length plus a space plus a small increment in the case of a pressure sensitive label strip, or a label length plus a small increment in the case of a label web) and then stop, unless it is first stopped by the leading edge of a pressure sensitive label or a register mark on the label web. As previously stated the label length monitor as so connected will automatically reset itself to zero and restart the feed of the feeding rolls 15,16.

In addition to the aforesaid connection, an imprinter 70 is connected to the chassis 37 in a known manner so that it is actuated to imprint each time the machine stops in its step-by-step movements. The imprinter 70 may be located in any suitable position over the path of feed of the label strip of web, so that it will imprint a given area of each label located therebelow during each period of rest of the machine. Since the label length monitor is time independent, the label strip or web feed does not effect the accuracy of the registering, and the actual area of imprint can be set quite precisely to coincide with the actual repeat length of the label strip or web. This will insure that all labels will receive an imprint within a very small well defined area on each label. In FIG. 1 of the drawings, the imprinter 70 is shown located in following relation to the feed rolls 15,16.

It will be understood from the foregoing, that the label length monitor will feed the label strip or web no more than one label pitch and then stop and imprint unless the label strip, or web is first caused to be stopped and imprinted by the sensor 36 being actuated by the leading edge of a pressure sensitive label on the label strip, or by a register mark 35 on the label web. For a better understanding of the operation of the modified machine, let us assume that the labels 12 in FIG. 1 are successively spaced pressure sensitive labels and that the two labels designated 12′,12′ are missing from the backing strip. The machine will not stop its step-by-step operation, but will continue to intermittently advance the label strip as called for by the signals from the product sensor 38. Each advance will call for an imprint on the label, or on the space on the backing strip from which a label is missing, that underlies the imprinter 70 when the web stops, either because the sensor 36 has been actuated by the leading edge of a following label or because of the label pitch metered by the monitor. In this way, every label or missing label space will be imprinted before it reaches the peeling blade which separates the pressure sensitive labels from their backing strip. If the labels 12 are regular labels 12 forming part of a label web, the modified monitor will operate in the same way to provide an imprint on each and every label even though some of the register marks 35 on such web are either missing, or not recognizable by the sensor 36.

Since the labeling of pressure sensitive labels, the modified machine will not stop in its normal function of supplying an imprinted pressure sensitive label, or a missing label area of the backing strip, upon each signal from the product sensor 38, certain of the products 27 will not have labels applied thereto in the event that there are labels missing from the carrier strip. Accordingly, means must be provided to detect whether a product 27 passing beyond the label applying station 20 has not had a label applied thereto. Such means, as indicated in FIG. 1 of the drawings, may be a known photoelectric scanner 75 capable of detecting whether a label is missing from and connected to a warning device 76 such as a bell, or a light, etc. Such an unlabeled product can then be automatically ejected from the line and recycled in a manner known to the art, or manually recycled by operating personnel.

While we have hereinabove described and illustrated a preferred embodiment of our invention, it will be apparent to those skilled in the art that various changes and modifications thereof may be made without departing from the spirit of the invention or the scope of the appended claims.

I claim:

1. In a labeling machine, a label applying station, means for feeding a succession of products toward and past said applying station, means for feeding a series of labels along a path toward said applying station, a label length monitor operatively connected to said label feeding means and including means for counting a predetermined number of given fractional label lengths totaling a whole length greater than the length of a given label as the label passes a given point in the path of feed thereof, and means to control said label feeding means, product sensor means connected to said control means and operable to cause said control means to start the feed of a label for the product detected by said product sensor means, a label sensor located at said given point and actuated each time the leading edge of a given label moves through said given point, said label sensor being connected to said control means and operable to actuate said control means to stop the operation of said label feeding means when the leading edge of a succeeding label moves through said given point before said counting means has counted said predetermined number of given fractional lengths, said counting means being operable to actuate said control means to stop the operation of said label feeding means if said label sensor has failed to actuate said control means before said predetermined number of lengths has been counted by said counting means.

2. In a labeling machine as defined in claim 1, in which said control means when actuated by said product sensor simultaneously starts the feed of a label and actuates said counting means to count said fractional label lengths, said control means being adapted to stop and reset intermittently the count of said counting means each time said control means is actuated by said label sensor to stop the operation of said label feeding means.

3. In a labeling maching as defined in claim 2, in which said counting means is connected to said control means to prevent the latter being actuated by said product sensor when said counting means has counted said predetermined number of label lengths, said control means having means for selectively rendering said control means reoperable by said product sensor.

4. In a labeling machine as defined in claim 2, in which said counting means is constructed and arranged with respect to said control means that said counting means will automatically reset itself to zero count each time it has counted said predetermined number of label lengths unless it has been first stopped by the action of said label sensor on said control means.

5. In a labeling machine as defined in claim 4, including as imprinter located adjacently over the path of feed of said labels and connected to said control means, said control means being operable to actuate said imprinter to print each time said label feeding means is stopped.

6. In a labeling machine as defined in claim 1, in which said feeding means comprises a constantly driven feed roll, connected to the longitudinal center of said feed roll is a counting disc provided on its periphery with marks corresponding to given fractions of the periphery of said feed roll, and registry means connected to said counting means and adapted to read successively the marks on said rotating counting disc, said registry means being adapted to actuate said counting means each time a counting disc mark is read thereby.

* * * * *

UNITED STATES PATENT AND TRADEMARK OFFICE

CERTIFICATE OF CORRECTION

PATENT NO. : 4,397,709

DATED : August 9, 1983

INVENTOR(S) : Alfred F. Schwenzer

It is certified that error appears in the above-identified patent and that said Letters Patent are hereby corrected as shown below:

Column 3, line 30, after "numbers" the word "generated" should be --registered--.

Column 4, line 1, after "label" the number "21" should be --12--.

Signed and Sealed this

*Twenty-fourth* Day of *January 1984*

[SEAL]

*Attest:*

GERALD J. MOSSINGHOFF

*Attesting Officer* *Commissioner of Patents and Trademarks*